United States Patent
Pau et al.

(10) Patent No.: US 7,663,695 B2
(45) Date of Patent: *Feb. 16, 2010

(54) METHOD AND SYSTEM FOR DE-INTERLACING DIGITAL IMAGES, AND COMPUTER PROGRAM PRODUCT THEREFOR

(75) Inventors: Danilo Pau, Sesto San Giovanni (IT); Emiliano Piccinelli, Monza (IT); Fabrizio Rovati, Cinisello Balsamo (IT); Daniele Alfonso, Monza (IT); Elio Privitera, Monza (IT); Angelo Schiavone, Cinisello Balsamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 726 days.

This patent is subject to a terminal disclaimer.

(21) Appl. No.: 11/041,518

(22) Filed: Jan. 21, 2005

(65) Prior Publication Data

US 2005/0179814 A1     Aug. 18, 2005

Related U.S. Application Data

(63) Continuation-in-part of application No. 09/849,503, filed on May 4, 2001, now Pat. No. 6,891,891, and a continuation-in-part of application No. 10/925,884, filed on Aug. 24, 2004, now Pat. No. 7,375,763.

(30) Foreign Application Priority Data

May 5, 2000 (EP) .................................. 00830332
Aug. 26, 2003 (EP) .................................. 03425560

(51) Int. Cl.
H04N 7/01 (2006.01)
H04N 7/12 (2006.01)
H04N 5/14 (2006.01)
H04N 5/16 (2006.01)
H04N 9/64 (2006.01)
H04N 11/20 (2006.01)

(52) U.S. Cl. ........................ 348/452; 348/448; 348/699; 348/700; 375/240.16; 382/236

(58) Field of Classification Search ................. 348/448, 348/449, 452, 699, 700; 375/240.16; 382/236
See application file for complete search history.

(56) References Cited

U.S. PATENT DOCUMENTS 5,546,130 A    8/1996    Hackett et al. ............... 348/447

(Continued)

OTHER PUBLICATIONS

Accame, "An Integrated Approach to Block Based Motion Estimation for Video Coding," *IEEE Transactions on Consumer Electronics*, 44(1): 52-61, 1998.
Kim, "Block Motion Estimation Based on Spatio-Temporal Correlation," *IEEE Tencon—Digital Signal Processing Applications*, pp. 955-960, Nov. 1996.
Wiegand, "Block-Based Hybrid Video Coding Using Motion-Compensated Long-Term Memory Prediction," *Telecommunications Institute, University of Erlangen-Nuremberg*, pp. 153-158, 1997.

*Primary Examiner*—Brian P Yenke
(74) *Attorney, Agent, or Firm*—Lisa K. Jorgenson; E. Russell Tarleton; Seed IP Law Group PLLC

(57) ABSTRACT

A spatial-type de-interlacing process to be applied to a digital image for obtaining a spatial reconstruction. Furthermore, to the digital image there are also applied one or more temporal-type motion compensation de-interlacing processes for obtaining one or more temporal reconstructions, and the spatial reconstruction and the one or more temporal reconstructions are sent to a decision module. The decision module applies a cost function to the spatial reconstruction and the temporal reconstructions and chooses from among the spatial reconstruction and the temporal reconstructions the one that minimizes the cost function. Preferential application is to display systems, in particular displays of a cathode-ray type, liquid-crystal type, and plasma type which use a mechanism of progressive scan.

37 Claims, 10 Drawing Sheets

U.S. PATENT DOCUMENTS

| | | | |
|---|---|---|---|
| 5,581,308 A | 12/1996 | Lee | 348/699 |
| 5,594,504 A * | 1/1997 | Ebrahimi | 375/240.16 |
| 5,661,525 A | 8/1997 | Kovacevic et al. | 348/452 |
| 5,668,608 A | 9/1997 | Lee | 348/699 |
| 5,689,305 A | 11/1997 | Ng et al. | |
| 5,703,966 A | 12/1997 | Astle | |
| 5,726,713 A | 3/1998 | Panis | |
| 5,745,183 A | 4/1998 | Lam | 348/416 |
| 5,784,114 A | 7/1998 | Borer et al. | 348/452 |
| 5,786,860 A | 7/1998 | Kim et al. | 348/416 |
| 5,936,676 A | 8/1999 | Ledinh et al. | 348/452 |
| 5,943,099 A | 8/1999 | Kim | 348/448 |
| 6,014,181 A | 1/2000 | Sun | 348/699 |
| 6,122,320 A * | 9/2000 | Bellifemine et al. | 375/240 |
| 6,262,773 B1 | 7/2001 | Westerman | 348/448 |
| 6,414,719 B1 | 7/2002 | Parikh | |
| 6,442,203 B1 | 8/2002 | Demos | 375/240.16 |
| 6,512,550 B1 | 1/2003 | de Garrido et al. | 348/452 |
| 6,557,345 B1 | 5/2003 | Moeckel | |
| 6,563,872 B2 | 5/2003 | Suzuki | 375/240.03 |
| 6,606,126 B1 | 8/2003 | Lim et al. | |
| 6,661,464 B1 | 12/2003 | Kokkosoulis et al. | |
| 6,891,891 B2 | 5/2005 | Pau et al. | |
| 6,900,846 B2 | 5/2005 | Lee et al. | |
| 6,940,557 B2 | 9/2005 | Handjojo et al. | |
| 6,992,725 B2 | 1/2006 | Mohsenian | |
| 7,015,971 B2 | 3/2006 | Sirtori et al. | |
| 7,042,512 B2 | 5/2006 | Yang et al. | |
| 7,050,108 B2 * | 5/2006 | Nishibori et al. | 348/459 |
| 7,057,665 B2 | 6/2006 | Jung et al. | |
| 7,064,792 B2 | 6/2006 | Yang et al. | |
| 7,075,581 B1 | 7/2006 | Ozgen et al. | |
| 7,098,859 B2 * | 8/2006 | Shimawaki et al. | 343/781 CA |
| 7,098,957 B2 | 8/2006 | Kim et al. | |
| 7,113,222 B2 | 9/2006 | Kodama | |
| 7,154,556 B1 | 12/2006 | Wang et al. | |
| 7,277,132 B2 * | 10/2007 | Chen et al. | 348/448 |
| 7,321,396 B2 * | 1/2008 | Jung et al. | 348/452 |
| 7,349,030 B2 * | 3/2008 | Nagakura et al. | 348/452 |
| 2002/0012396 A1 * | 1/2002 | Pau et al. | 375/240.16 |
| 2002/0080284 A1 | 6/2002 | Kim et al. | 348/700 |
| 2002/0171759 A1 | 11/2002 | Handjojo et al. | 348/452 |
| 2003/0048278 A1 | 3/2003 | Ji et al. | 345/606 |
| 2005/0110901 A1 * | 5/2005 | Alfonso et al. | 348/448 |
| 2005/0179814 A1 | 8/2005 | Pau et al. | |

* cited by examiner

Frame t-l        Frame t

METHOD AND SYSTEM FOR DE-INTERLACING DIGITAL IMAGES, AND COMPUTER PROGRAM PRODUCT THEREFOR

BACKGROUND OF THE INVENTION

1. Field of the Invention

The present invention relates to techniques for digital-image processing, including motion estimation techniques, and has been developed with particular attention paid to its possible application to the processing of television images and to the display of the television signal on displays, such as personal-computer displays of the cathode-ray type, liquid-crystal type or plasma type, which use a progressive-scanning mechanism.

Even though in what follows, for reasons of clarity and simplicity of exposition, practically exclusive reference will be made to this application, it must in any case be borne in mind that the significance of application of the invention is more general. The invention is in fact applicable to all techniques of digital-image processing in which there arise operating conditions of the type described in what follows.

2. Description of the Related Art

The television system adopted in Europe, i.e., the Phase-Alternate-Line (PAL) system, is characterized by a frame frequency of 25 Hz: this means that it is possible to display 25 images or frames per second, each of which is made up of a grid of 720×576 samples, called pixels (picture elements), arranged in rows. In fact, the raster, i.e., the electron beam that draws the image on the television display, operates at a frequency of 50 Hz, and once every second creates on the display 50 half-images, or fields, each of which is sampled at a different instant in time, with a time interval between said fields of one fiftieth of a second. Each field contains alternately the even rows only or else the odd rows only of a complete image. Consequently, the images displayed on the television screen have their even rows belonging to one field, referred to as even field, and their odd rows belonging to another field, referred to as odd field. When the images are divided in this way, they are referred to as "interlaced" images.

The PAL system was originally conceived for systems with cathode-ray displays, but television images are not suited for being displayed on other types of display, such as, for example, computer monitors, or modern televisions with plasma or liquid-crystal displays. These systems, in fact, use a display mechanism referred to as "progressive", which each time composes on the display a complete image, and not a single field. A television video sequence in PAL format, displayed on these systems, would cause an unpleasant "mosaic" effect, due to the fact that each image is in effect made up of two different interlaced fields.

To display the images correctly, it is therefore necessary to subject them to a de-interlacing procedure, which provides for reconstruction of a complete image, starting from a single field. In the case of even fields, the odd lines of the image are reconstructed; in the case of odd fields, the even lines of the image are reconstructed. The reconstructed lines are then added to the original ones, and a complete image or frame is thus obtained.

The de-interlacing procedure can be carried out in different ways, which can be reduced to two main categories:
 motion-compensated procedures; and
 non-motion-compensated procedures.

Motion-compensated (or temporal) de-interlacing procedures use motion-estimation techniques for reconstructing a field starting from temporally preceding and subsequent information, whilst non-motion-compensated (or spatial) de-interlacing procedures use spatial interpolation for reconstructing the even or odd rows of a frame, starting from the odd or even rows, respectively.

To carry out the procedure of non-motion-compensated de-interlacing of digital images, it is known to use a procedure referred to as Edge-Line Averaging (ELA).

FIG. 1 illustrates a part of the pixels of an image or frame FRM. In this frame FRM, the odd rows that make up a field to be reconstructed MFD are to be reconstructed starting from the even rows. According to the ELA procedure, the pixels belonging to row N, where N is an odd integer, can be reconstructed starting from the adjacent pixels, belonging to the rows N−1 and N+1.

In particular, if a pixel to be reconstructed X of the field MFD is in the position M on the row N of the frame FRM, it can be reconstructed using the pixels in the positions M−1, M and M+1 on the aforesaid rows.

If A, B and C designate the pixels belonging to a work window FL in positions M−1, M and M+1 in the row N−1 of the frame FRM, and D, E and F designate the pixels in positions M−1, M and M+1 in the row N+1 of the frame FRM, the pixel to be reconstructed X can be reconstructed using the following interpolation formula:

$$X = \begin{cases} \frac{A+F}{2} \text{if} |A-F| < |B-E|, |C-D| \\ \frac{B+E}{2} \text{if} |B-E| < |A-F|, |C-D| \\ \frac{C+D}{2} \text{if} |C-D| < |A-F|, |B-E| \end{cases} \quad (1)$$

In other words, as can also be inferred from FIG. 1, the pixel X to be reconstructed is reconstructed by linear interpolation of the most correlated pair of pixels belonging to the nearest rows of the field of opposite parity, the correlation between two pixels being defined as the distance of the respective values.

To carry out, instead, the procedure of motion-compensated, or temporal, de-interlacing of digital images for composing the field to be reconstructed MFD, illustrated in FIG. 2, this field to be reconstructed MFD is, instead, broken down into a series of blocks BK. Each block BK is reconstructed by interpolation of two blocks $BK_m$, $BK_n$ belonging to another two frames, of the same parity, that temporally precede and follow, respectively, the frame to be reconstructed containing the field to be reconstructed MFD. The preceding frame includes a field n that contains the block $BK_n$ and the following frame includes a field m that contains the block $BK_m$.

The pair of blocks is chosen by minimizing a correlation function, such as, for example, the Sum-of-Absolute-Differences (SAD) function, which is defined as follows: if SAD (x,y) is the SAD function between a preceding block $BK_n$ of W×H pixels (where W and H are positive integers), set in a position (x,y) in the preceding field n, which has pixels of intensity $V_n(x+i,y+j)$, and a corresponding subsequent block $BK_m$, set in a position (x+dx,y+dy) in the subsequent field m, which has pixels of intensity $V_m(x+dx+i,y+dy+j)$, then the SAD function is:

$$SAD(xy) = \sum_{i=0}^{W} \sum_{j=0}^{H} V_n(x+i, y+j) - V_m(x+dx+i, y+dy+j) \quad (2)$$

The position of the preceding reference block $BK_n$ with respect to the block BK to be reconstructed is indicated by a motion vector MV, whilst the position of the subsequent block $BK_m$ is indicated by an equal and opposite motion vector designated by −MV in FIG. 2. In this case, the term "balanced motion estimation" is used, in so far as the two reference blocks, the preceding one $BK_n$ and the subsequent one $BK_m$, are in an opposite position with respect to that of the block BK to be reconstructed.

For minimizing the correlation function, whether it is the aforesaid SAD function or any other function, it is possible to use any technique of motion estimation, such as for example the full-search technique, which verifies exhaustively all the possibilities within a certain search area, called "search window".

The de-interlacing procedures listed above, however, do not succeed in guaranteeing optimal performance in all the situations that can occur during processing of a video sequence.

BRIEF SUMMARY OF THE INVENTION

One embodiment of the present invention provides a solution that guarantees optimal performance in the operations of de-interlacing of an interlaced digital image.

According to the present invention, one embodiment is directed to a method, another to the corresponding system, and yet another to the corresponding computer product directly loadable into the memory of a digital computer such as a processor.

Basically, the solution described herein provides for making a choice between different procedures for de-interlacing digital images that generate different reconstructions, by an operation of evaluation and minimization of a cost function. There are also proposed improved procedures of digital image de-interlacing of a spatial and temporal type.

As compared to the known solutions, a solution proposed herein enables a reconstruction to be obtained without appreciable visual defects.

BRIEF DESCRIPTION OF THE SEVERAL VIEWS OF THE DRAWINGS

The invention will now be described, purely by way of non-limiting example, with reference to the annexed drawings, in which.

DETAILED DESCRIPTION OF THE INVENTION

The de-interlacing procedure proposed provides basically for providing a non-motion-compensated (or spatial) de-interlacing procedure as well as a motion-compensated (or temporal) de-interlacing procedure designed to produce reconstructions of improved quality, as well as making a decision among the reconstructions originated by said spatial and temporal procedures, introducing an appropriate cost function for making this decision.

There is thus described hereinafter, first of all, a non-motion-compensated digital-image de-interlacing procedure which improves the non-motion-compensated procedure for de-interlacing digital images of the ELA type described previously with reference to FIG. 1 by introducing the following operations:

an operation of extension of the work window;

operations designed to obtain a sub-pixel degree of precision;

an operation of adaptive sizing of the work window; and an operation of post-processing and final filtering of the spatial reconstruction.

Figure 3:
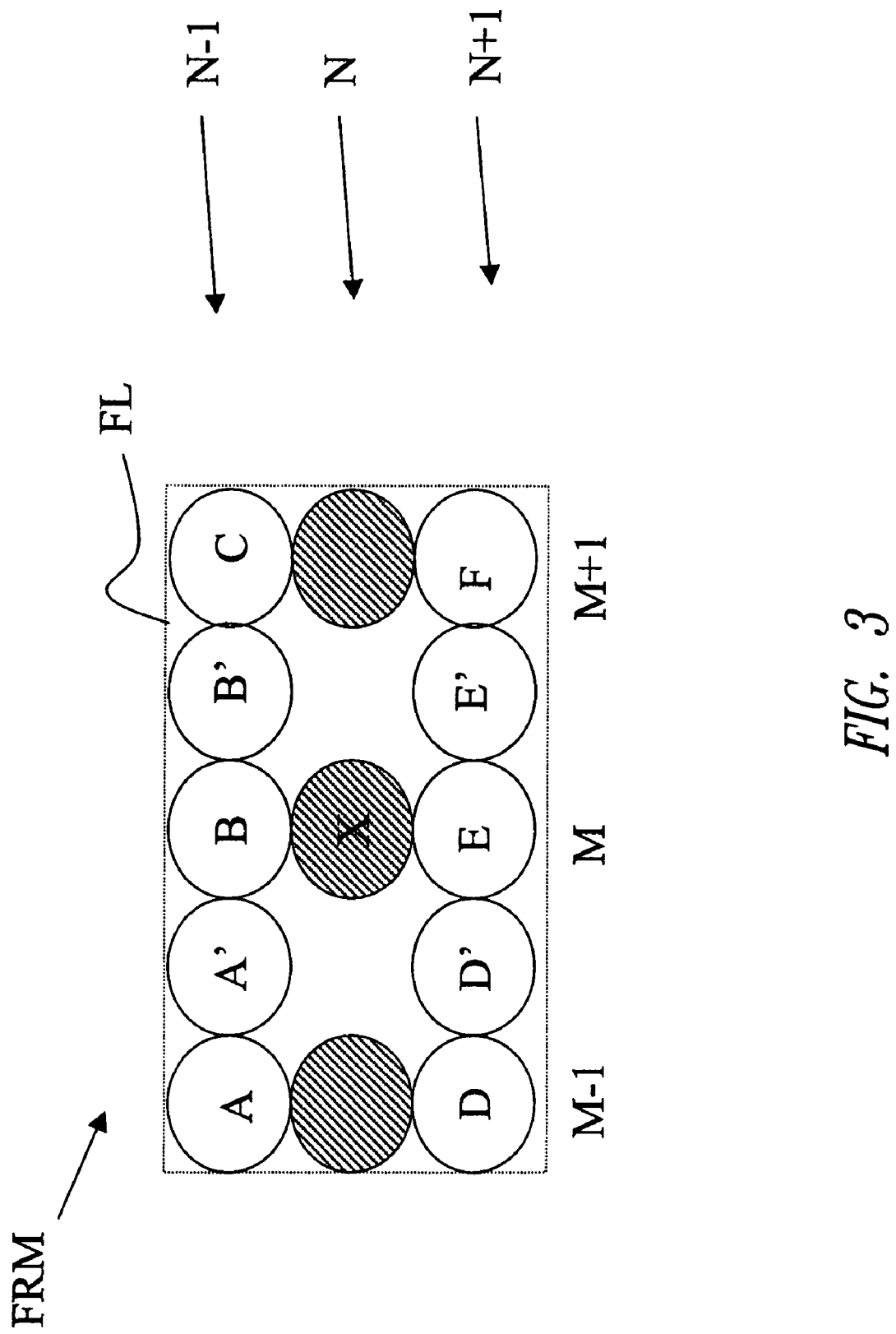
FIG. 3 illustrates a diagram corresponding to an operation of a procedure of spatial de-interlacing comprised in one method according to the invention.

These operations are now described in greater detail, with reference to FIG. 3.

As regards the operation of extension of the work window FL, the spatial de-interlacing procedure proposed does not envisage simply considering just three pairs of pixels (as described previously with reference to FIG. 1) among which the most correlated pair is to be chosen, but rather it envisages the use of a number of pairs P of pixels greater than or equal to three.

The advantage that is obtained extending in this way the work window FL from the immediately adjacent pixel to other nearby pixels is an increase in the likelihood of finding a best correlation, the result being that the reconstructed pixel will be more similar to the adjacent ones, and the overall quality of the final image will thus be improved.

The contribution of the operation of extension of the work window FL described above can be evaluated in association with the operation of adaptive sizing of the work window FL, which will be described in what follows.

The procedure of non-motion-compensated de-interlacing of digital images of the ELA type described above with reference to FIG. 1 considers only the original pixels that are in the row above and in the row below the one containing the pixel X to be reconstructed. The non-motion-compensated de-interlacing procedure proposed provides for increasing the quality of the spatial reconstruction by considering, in addition to the original pixels, also the pixels in the intermediate positions, i.e., implementing operations designed to obtain a sub-pixel degree of precision.

For example, in the case of a number of pairs P equal to three, it is possible to define new pixels A', B', D' and E', as shown in FIG. 3, where the pixel A' is located between the pixel A and the pixel B, the pixel B' between the pixel B and the pixel C, the pixel D' between the pixel D and the pixel E, and the pixel E' between the pixel E and the pixel F. In this case, the relation (1) for calculating the pixel X is transformed as indicated below:

$$X = \begin{cases} \frac{A+F}{2} & \text{if } |A-F| < |B-E|, |C-D|, |A'-E'|, |B'-D'| \\ \frac{A'+E'}{2} & \text{if } |A'-E'| < |A-F|, |B-E|, |C-D|, |B'-D'| \\ \frac{B+E}{2} & \text{if } |B-E| < |A-F|, |C-D|, |A'-E'|, |B'-D'| \\ \frac{B'+D'}{2} & \text{if } |B'-D'| < |A-F|, |B-E|, |C-D|, |A'-E'| \\ \frac{C+D}{2} & \text{if } |C-D| < |A-F|, |B-E|, |A'-E'|, |B'-D'| \end{cases} \quad (3)$$

The new pixels A', B', C' and D' can be calculated starting from the original pixels horizontally adjacent thereto. By way of example, but not necessarily, it is possible to define the pixel A' simply by linear interpolation:

$$A' = \frac{A+B}{2} \quad (4)$$

Once the operations described above designed to obtain a sub-pixel degree of precision have been introduced, it is possible to introduce the operation of adaptive sizing of the work window FL in the procedure of non-motion-compensated de-interlacing of digital images of the ELA type.

The procedure for non-motion-compensated de-interlacing of digital images of the ELA type according to the known art identifies the pair of pixels having the maximum correlation by simply considering the distance between the values of the two pixels. Not necessarily does this procedure enable the maximum visual quality to be achieved, in so far as the pair having the maximum correlation is not always the right one to be interpolated. To overcome this drawback, there are imposed restrictions on the procedure of search for the pair having the maximum correlation among the possible pairs P of pixels. This can be obtained by adaptively varying the number of pairs P each time considered, i.e., the size of the work window FL.

To provide a better example, consider a first pixel to be reconstructed X1 and a second pixel to be reconstructed X2, where the first pixel to be reconstructed X1 has already been reconstructed using a first number P1 of pairs of pixels, whilst the second pixel to be reconstructed X2 has still to be reconstructed using a work window that comprises a second number P2 of pairs of pixels; the second number P2 of pairs can then be determined starting from the first number P1 of pairs applying the following rules:

- if the first pixel to be reconstructed X1 has been reconstructed using the pair of original pixels corresponding to the vertical direction, then P2=P1−1;
- if the first pixel to be reconstructed X1 has been reconstructed using the pair of original pixels corresponding to the steepest slope possible (both towards the right and towards the left), then P2=P1+1;
- in all the other cases, P2=P1;
- in any case, it must be always P2≧3 and P2≦Pmax, where Pmax indicates a maximum number of pixels determined a priori.

From the simulations carried out, it has been found experimentally that an adequate value for the maximum number of pairs of pixels Pmax is seven. A further extension of the work window would take into account pixels that are located at an excessive distance apart from one another, and hence, in effect, uncorrelated.

Once an even field has been reconstructed on the basis of an odd field, or vice versa, applying the spatial de-interlacing procedure just described, it is necessary to put this even field and this odd field together to obtain the final complete image. A similar operation can be executed by simply alternating the original rows with the reconstructed ones, but this can lead to an undesirable effect of distortion, in the case where some pixels are reconstructed in an excessively approximate manner. This drawback can be overcome by carrying out an appropriate post-processing operation, i.e., a filtering operation, on each pixel to be reconstructed X, to obtain a new reconstructed pixel X' filtered according to the original pixels A and B respectively in a top position and a bottom position with respect to the pixel to be reconstructed X, i.e., by applying a vertical FIR filter defined as:

$$X' = f(X,A,B) \quad (5)$$

A possible choice for the filtered reconstructed pixel X' can for example be the following:

$$X' = \frac{A + 2X + B}{4} \quad (6)$$

Moreover, the filtering operation just described can be dynamically varied according to the degree of correlation of the pixel to be reconstructed X with the pixels A and B, for the purpose of obtaining the best performance possible. In other words, there can be chosen a first filtering function f1 if the relations |A−X|<T or |B−X|<T are verified, and a second filtering function f2 otherwise. T indicates an appropriate threshold value determined heuristically, and in this case equal to 15, since the values of the pixels are comprised between 0 and 255. In this case, the filtering functions f1 and f2 are determined via the following coefficients:

f1=(0.125, 0.75, 0.125)

f2=(0.25, 0.5, 0.25)

The first filtering function f1 is used when the pixel to be reconstructed X is already sufficiently correlated with the two adjacent pixels, the need to increase to no purpose the correlation being thus prevented. Instead, the second filtering function f2 is used when the initial correlation is low with the aim of increasing it.

Note that the choice of coefficients that are powers of ½ advantageously favors an immediate hardware implementation of the procedure.

The above post-processing operation can be considered similar to the smoothing operation, commonly used in the field of digital-image processing. It is to be noted, however, that the smoothing operation is used for smoothing out the outlines of objects, when these are too evident, whilst in the context of the spatial-de-interlacing procedure proposed, the post-processing operation described above is necessary for restoring the correct outline of an object, in the case where it has been reconstructed in an approximate way. Furthermore, normally, the smoothing operation is obtained by applying a two-dimensional filter with fixed coefficients. In the case of the operation of post-processing and filtering described, instead, a one-dimensional non-linear adaptive filter, purposely designed for increasing the correlation between the pixel to be reconstructed X and the original pixels vertically adjacent thereto. Finally, application to the spatial-de-interlacing procedure of a simple conventional smoothing operation would cause an increase of the sawtoothing of the inclined edges, which is aesthetically undesirable, said increase being due to the alternation of the original rows and the rows reconstructed in such a way as to resemble excessively the original ones.

Hence, at the expense of just a minimal increase in computational complexity, the procedure of non-motion-compensated, or spatial, digital-image de-interlacing proposed enables a sensible improvement to be achieved as compared to the known methods, both in terms of PSNR (Peak Signal-to-Noise Ratio) obtained and in qualitative terms, i.e., by direct observation of the video sequences on television sets of professional quality.

The de-interlacing procedure moreover exploits an improved temporal de-interlacing procedure, in which the motion-estimation de-interlacing technique is extended and modified with respect to the motion-estimation procedure for video compression described in the European patent application EP-A-1152621, which corresponds to U.S. patent application Ser. No. 09/849,503, which was published on Jan. 31, 2002 as U.S. Publication No. US-2002-0012396A1, all of which are incorporated herein by reference in their entireties.

The above motion-estimation procedure for video compression is designed to operate in association with low-complexity video-compression systems, such as for example the H.263 or H.263+ coding systems. In these systems, motion estimation is used to predict a macroblock of 16×16 pixels belonging to the current image, with respect to another macroblock, called predictor, which is in an image preceding the current one. The motion-estimation procedure operates in such a way as to find the position of the predictor macroblock with respect to the current macroblock, identifying the predictor that minimizes a certain cost function, such as, for example, the SAD function defined by the relation (2) provided above.

In accordance with one disclosed embodiment of the invention, the motion estimation process belongs to the category of processes based on the evaluation of the spatio-temporal correlation existing among motion vectors belonging to adjacent blocks.

If the motion field varies slowly both locally and from frame to frame is true, then it may be possible to check only a few sets of candidate motion vectors. The candidate motion vector that produces the minimum SAD is selected as the predictor motion vector which, after a refining phase, yields the final motion vector.

Since it provides for the use of a motion vector acting as a predictor, this solution is classed as a prediction process.

Like all processes of this type, it is essentially based on two phases, namely:

the identification of the candidate predictors, and the refining of the best predictor.

At the end of the whole process, the motion vector that produces the lowest SAD is associated with each macroblock.

The first phase mentioned above therefore consists in identifying, from a set of candidates, the predictor motion vector identified as the best and therefore as that to which the subsequent refining phase is to be applied.

With the objective of achieving a low-complexity solution, the embodiment of the invention is intended to reduce the number of candidates as far as possible and, in the same way, to select "good" candidates, presumably those close to the correct vector.

The criterion for constituting the set of candidates is that of selecting the vectors of the relative macroblock position, in the current frame and in the preceding frame, which is close to the current vector. Naturally, there is a constraint due to the fact that a predictor vector must be calculated in advance.

Since the macroblocks are normally subjected to scanning in lexicographical order, only the vectors belonging to macroblocks located above and to the left of the current one are available as vectors usable as predictors.

Figure 4:
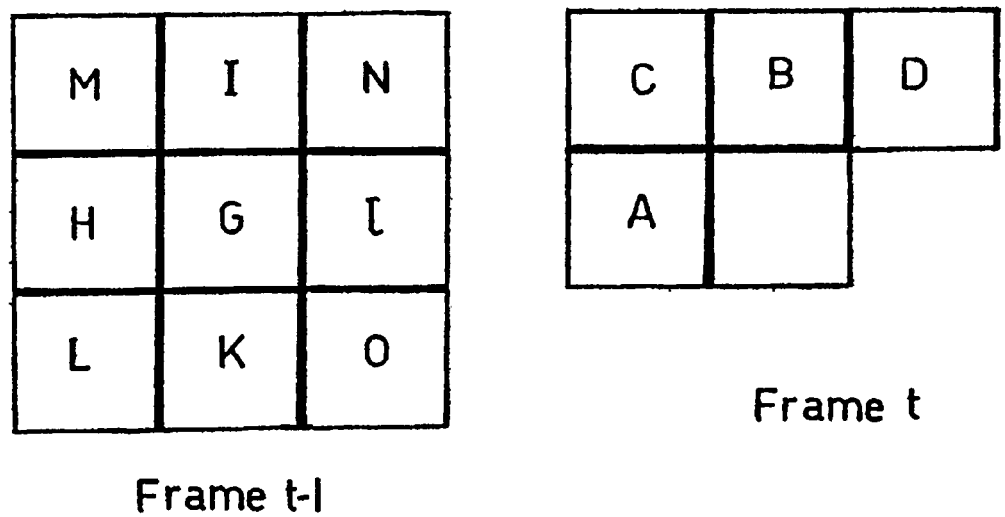
FIG. 4 shows the criteria for the execution of the spatial and temporal correlation function on macroblocks according to one embodiment of the invention.

FIG. 4 shows a solution to reduce the number of candidates while keeping the computation cost low. In a preferred embodiment, the solution according to the invention uses—for a macroblock—four candidate predictors; more precisely, these are two spatial predictors (one to the left and one above the current macroblock) taken from the same frame, and two temporal predictors (one homologous with and one to the left of the current macroblock) in the preceding frame.

This solution is shown schematically in FIG. 4, where the preceding frame (frame t-1) is shown on the left and the current frame (frame t) is shown on the right.

The current macroblock is the one left blank in the right-hand part of FIG. 4 and the macroblock G in the left-hand part of FIG. 4 represents the homologous macroblock of the preceding frame.

For clarity, the two spatial predictors taken from the frame t are those indicated by the letters A and B. The two temporal predictors are those indicated by the letters G and H in the frame t-1.

The motion vector, of the set thus defined, which produces the lowest residual error (for example, the lowest SAD function) is used as the starting point for the subsequent refining phase and is indicated below as the "best motion vector predictor."

When the predictor in question has been determined, the process continues with a refining phase implemented by means of a grid of n points that is applied to it.

Figure 5:
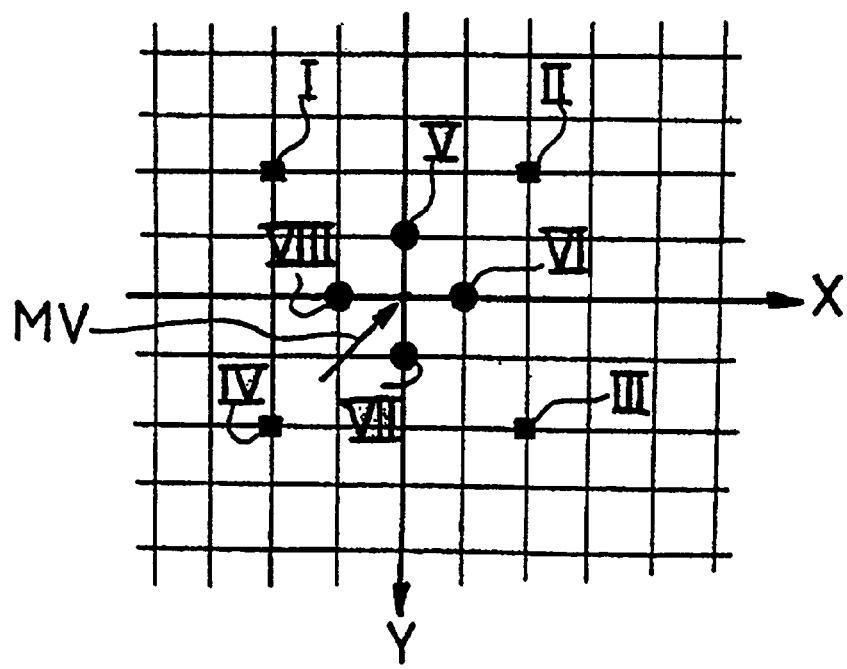
FIG. 5 shows the execution of the refining function as part of the solution according to the invention.

An example of such a grid is shown in FIG. 5. The grid in question is formed by four points I to IV at the vertices of a square and four further points V to VIII located at the vertices of a square of smaller size with its sides inclined at 45° to the sides of the square at whose vertices the points I to IV are located.

The background grid shown in FIG. 5 is a half pixel grid and it is assumed that points I to VIII are positioned at points of intersection of the lines of this grid.

The aforesaid grid is considered to be centered on the position to which the best motion vector MV points.

The distance of points I to VIII from the center is defined by a linear function which depends on the matching error found during the preceding step (for example, a distance defined as the product of corresponding coefficients and the corresponding SADs). Additionally, since the process operates with motion vectors with a precision of half a pixel, in a preferred embodiment, the points are at a distance of half a pixel from the center.

After all the points on the grid have been considered, the vector with the lowest SAD is selected as the motion vector for the current macroblock and is used for its motion compensation.

In those cases in which the best predictor may be incorrect, for example in the presence of a change of scene in the environment of a rapidly changing motion, the grid correction can be amplified. The grid is amplified only when the best predictor has a high SAD, which means that it is probably not a good predictor.

Starting from the analysis of the SAD distributions found for some sample sequences, it is possible to determine a linear function of the SAD (for example, the same coefficient x SAD function mentioned above), which can be used to calculate the magnitude of the amplification function and the number of points, while also discriminating the conditions in which amplification is necessary from those in which this step is not necessary.

A measure of the complexity of the solution according to the invention (particularly in respect of the comparison with other known solutions, such as those based on a full search algorithm) is provided by the number of times that the cost function is calculated. In the case in question, the measure can be found in the number of operations of calculating the SAD function per macroblock.

It should be noted that this measure of complexity is completely independent of the format and frame frequency of the sequence on which the coding process is carried out, and is therefore valid for all the coding algorithms.

For a full search algorithm, the number of calculations of the SAD depends on the dimensions of the search area. For example, in the default prediction operating mode of the H.263+video standard (see the document Image Processing Lab, University of British Columbia, "TMN (H.263+) encoder/decoder, version 3.0," TMN (H.263+) codec, September 1997) the search area has a size of 32×32 pixels. Additionally, the best motion vector that is found is refined with a precision of half a pixel, by the application of a grid on n points. Therefore, the computational complexity of the full search algorithm is $$OP_{MB} = \text{Num}.SAD_{integer\text{-}pixel} + \text{Num}.SAD_{half\text{-}pixel} = 32 \times 32 + 8 = 1032 \quad (II)$$

However, the embodiment of the invention requires, in the example of embodiment illustrated here, four calculations of SAD for the selection of the best predictor (see FIG. 4) and eight calculations for the refining grid (see FIG. 5). The calculation of the SAD function for the null vector must be added to these calculations. In conclusion, the total number of calculations of the SAD function is given, in the solution according to the invention, by:

$$OP_{MB} = \text{Num}.SAD_{half\text{-}pixe} + \text{Num}.SAD_{Null\text{-}Vector} = 12 + 1 = 13 \quad (III)$$

This embodiment of the invention can therefore be used to reduce the computational cost by approximately 90% with respect to the full search algorithm. Moreover, the cost is stable because the total number of calculations of the SAD function is the same for each macroblock. This gives rise to a considerable advantage of the solution according to the invention over other motion estimation algorithms with variable complexity deriving from their interactive form.

The embodiment of the invention lends itself to particularly advantageous developments with reference to the H.263+ video standard mentioned above.

This standard provides some optional modes which can be used to improve the subjective quality of the reconstructed sequences. In general, however, the use of these modes produces a more or less significant increase in the computational cost.

In the context of the illustration of the present invention it is advantageous to consider, among these options included in the standard, some options which are closer to the problem of motion estimation, in other words the improved PB-frames mode, abbreviated to "IPB mode," and the advanced prediction mode (commonly abbreviated to "APM"). The integration of these options into a predictive algorithm makes them more uniform with the standard.

For a description of the IPB mode, reference may usefully be made to the documents ITU Telecom Standardization Sector of ITU, "Video Coding for Low Bitrate Communication," Draft 21 ITU-T, Recommendation H.263+Version 2, January 1998 and ITU Telecom Standardization Sector of ITU, "Video Codec Test Model, Near Term, Version 10," TMN10 ITU-T, April 1998, as well as to the general document on the H.263+standard cited previously, which are incorporated herein by reference in their entirety.

As a variation from the standard, it is possible to introduce one change only in order to permit its integration in a functional way into the algorithm. This change relates to the order in which the motion estimation is carried out. The standard applies the motion estimation on the P frame of the PB pair first and then on the B frame of the pair (even if the temporal order is exactly the reverse).

However, this solution has the drawback that the temporal predictors of the B frame of the PB pair would be chosen from the reference motion field relating to the successive frame in temporal terms.

Figure 6:
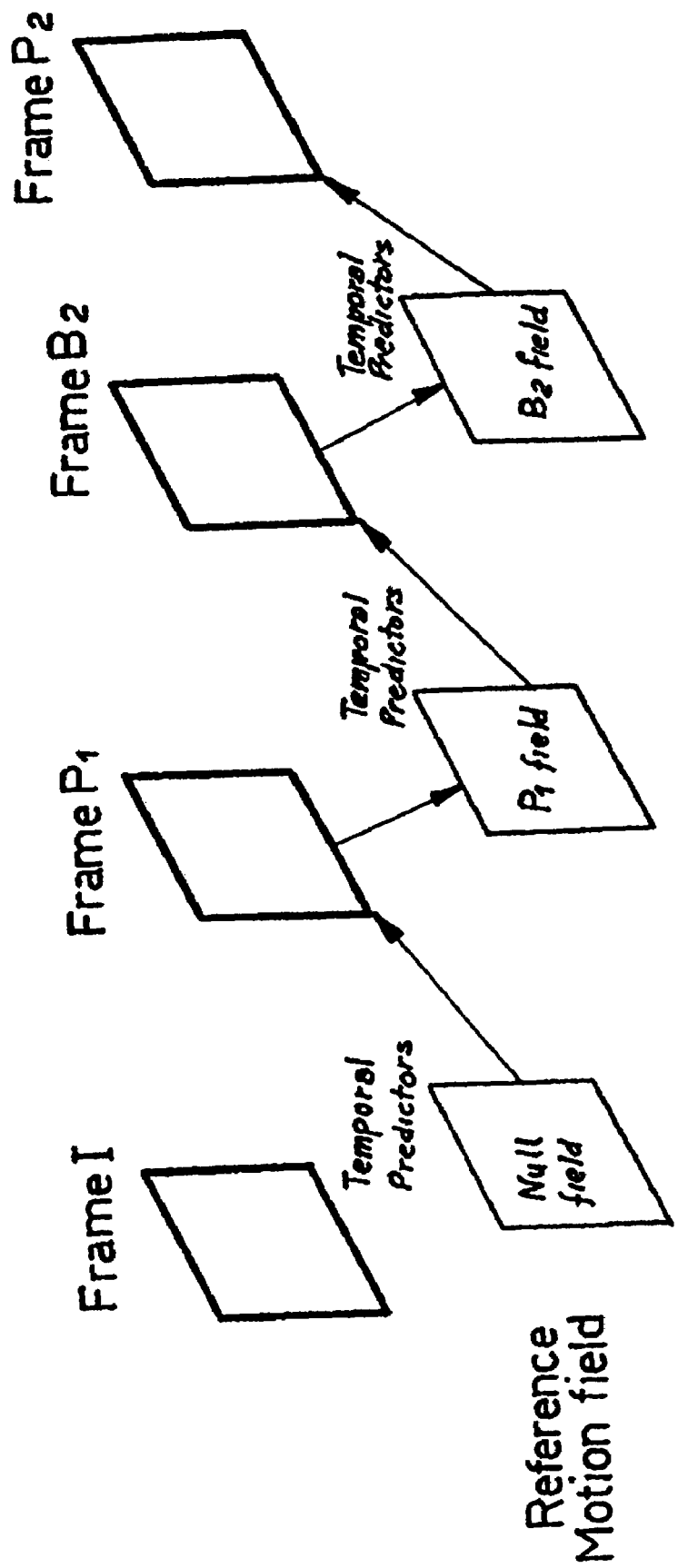
FIGS. 6 and 7 show schematically the application of the invention to the H.263+ video standard.

In the solution shown in FIG. 6, however, it can be seen that, in a possible application of the embodiment of the invention, the estimation order is inverted to maintain the temporal continuity of the frames. In particular, FIG. 6 shows, in the context of the frame sequence in the IPB mode, the management of the first PB pair (in other words, the frames $P_2 B_2$).

The ITU documents cited previously provide a detailed description of the APM mode.

In this field of application, the disclosed embodiment of the invention makes it possible, for example, to associate the frame of a macroblock with four vectors instead of only one. All this is done in order to provide a more accurate estimate.

As indicated in the standard, the use of the APM consists in an application of the motion estimation algorithm to the current macroblock (to obtain an associated motion vector as in the base mode) and a successive application of the same algorithm for each 8×8 block forming the 16×16 macroblock to which the previously found vector points (so that four associated vectors are obtained for the current macroblock). By means of special preference rules, the coder chooses the optimal mode for preparing the current macroblock.

Figure 7:
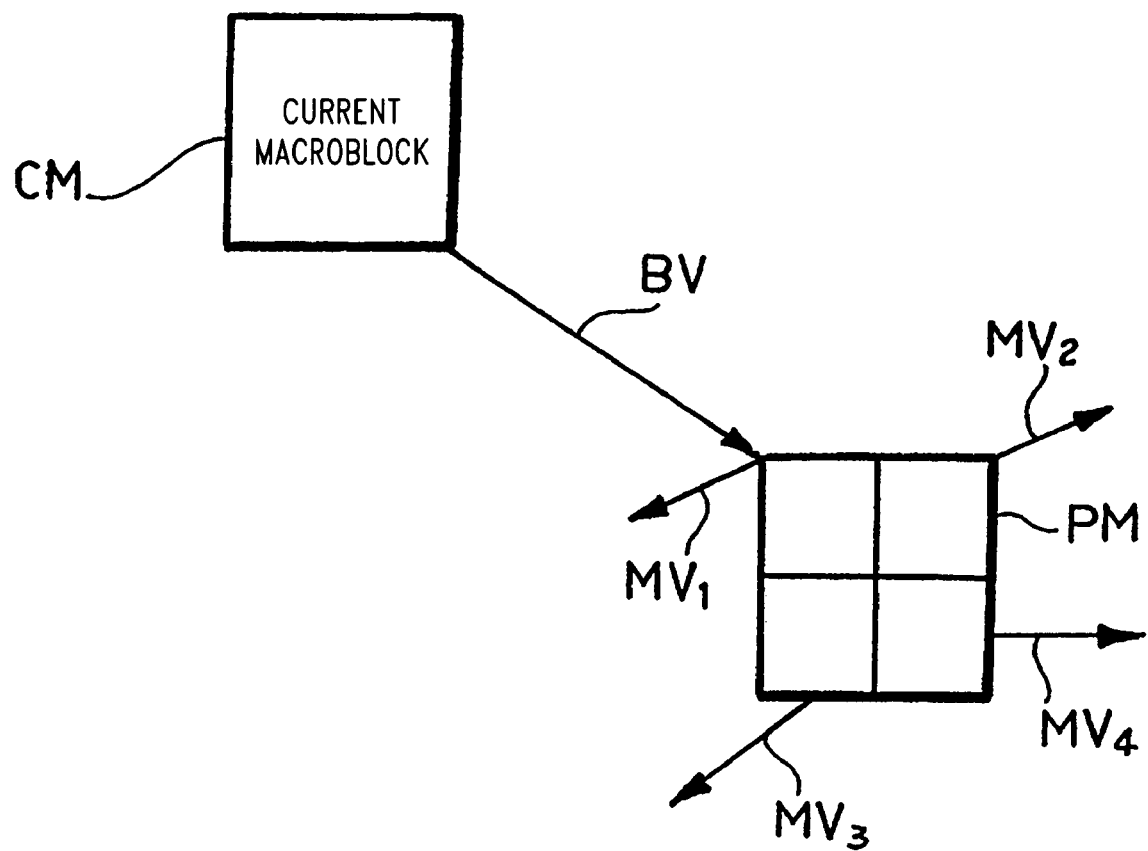

In the embodiment shown schematically in FIG. 7, based on the application of the solution according to the invention, the predictive process is applied in its full version only to the search vector associated with the 16×16 macroblock. On the other hand, only the refining phase of the algorithm is applied to the search for the four vectors for the 8×8 blocks.

This scheme is shown in FIG. 7, where CM indicates the current macroblock and PM indicates the macroblock found by prediction.

The arrow BV indicates the obtaining of the best motion vector for the current 16×16 macroblock, implemented by means of the predictive process, while the arrows $MV_1$, $MV_2$, $MV_3$ and $MV_4$ illustrate the obtaining of four corresponding best vectors obtained by the refining phase for the corresponding four 8×8 blocks of the PM macroblock obtained by prediction.

In the case of the APM mode, the complexity of the process according to the invention is greater as compared with the base version, owing to the fact that the number of predictor candidates is higher. For example, if the algorithm uses the equivalent of twenty-one predictors for a total of twenty-one SAD calculation operations per macroblock (it is emphasized that this is the maximum number of operations), the gain in terms of complexity is 1.62 times with respect to that of the base version.

Figure 2:
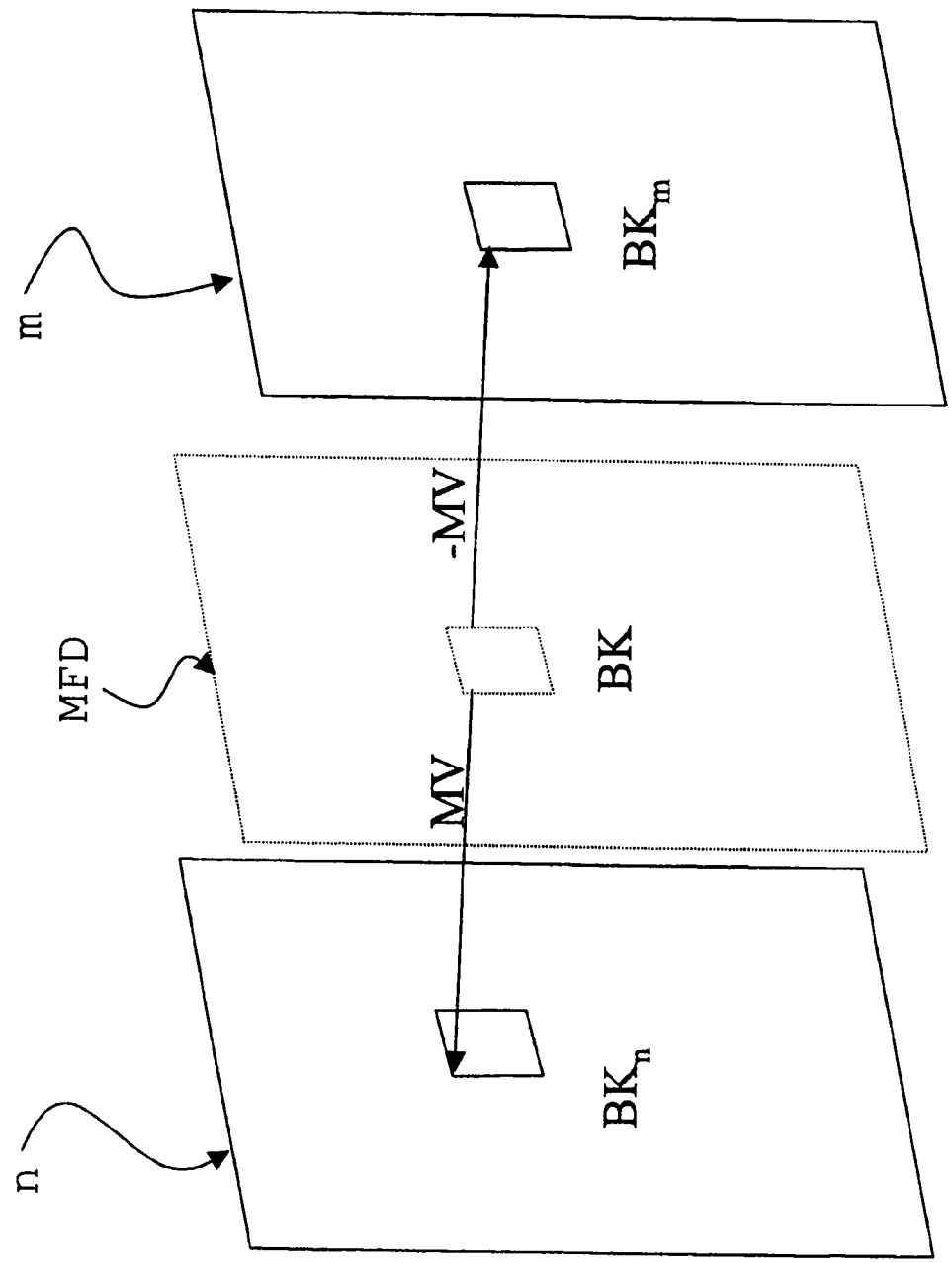

In the case of a temporal de-interlacing procedure, as explained previously with reference to FIG. 2, the task is different in so far as the aim is to find a pair of blocks.

In this case, the motion-compensated de-interlacing procedure comprises two distinct operations:

an operation of testing of a number Q of vectors temporally and spatially preceding the one referring to the current macroblock, with final choice of the best vector; and an operation of application of a refining grid, made up of R points, in the neighborhood of the position pointed by the best vector found in the preceding step.

These two operations are followed by a conclusive operation of choice of the best position.

In the case where it is desired to carry out a balanced estimation, the proposed procedure operates in each step in such a way as to generate a backward motion vector MV, which points to the temporally subsequent field, and a forward motion vector −MV, which is equal and opposite and points to the temporally preceding field, in a similar way to what has been illustrated previously with reference to FIG. 2; the total number of vectors tested is hence Q+R.

There are, however, introduced further improvements to increase the performance of the temporal de-interlacing procedure.

Figure 8:
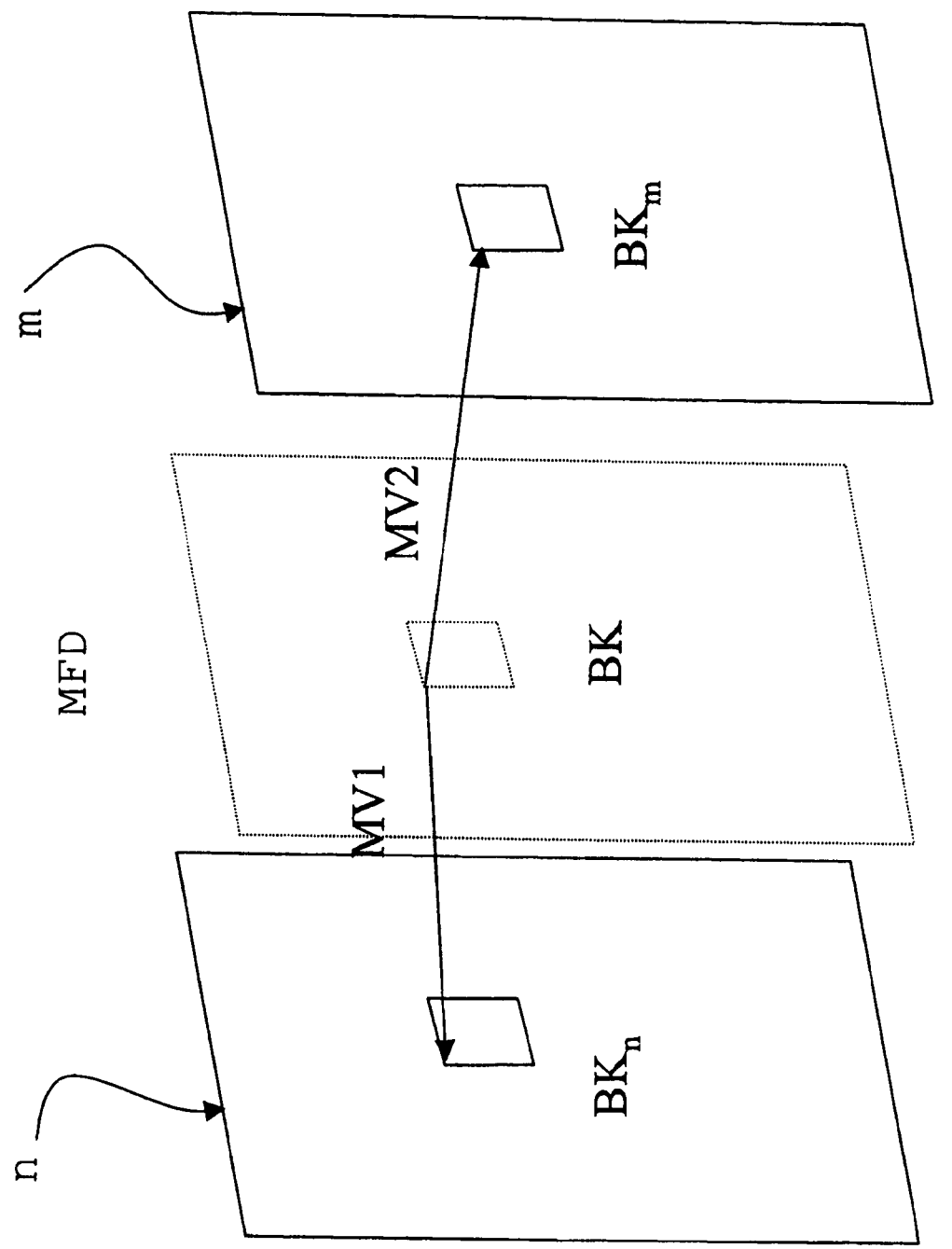
FIG. 8 illustrates a diagram corresponding to an operation of a procedure of temporal de-interlacing comprised in the method of FIG. 3.

In the case of non-balanced estimation, there is proposed elimination of the limitation represented by balanced estimation, by operating in such a way that the procedure will generate at each step two distinct vectors, as illustrated in FIG. 8: a first backward vector MV1 that points to the preceding field n and a second forward vector MV2 that points to the subsequent field m. In this case, the second vector MV2 is in general different in value and sign from the first vector MV1.

The first backward vector MV1 and the second forward vector MV2 are obtained applying two different refining grids in the operation of application of a refining grid of the temporal de-interlacing procedure proposed, a first grid referring to the preceding field and a second grid to the subsequent field.

It is therefore necessary to test all the possible combinations of the R points of the first grid with the Q points of the second grid, for a total of R×Q different tests to be carried out.

Since the hypothesis underlying balanced estimation is a linear movement of an object from the preceding field n to the subsequent field m with respect to the current field, the improvement just described removes said hypothesis, since it enables the movements of an object to be approximated by a broken line, thus obtaining as a final result a greater precision of the procedure.

Figure 9:
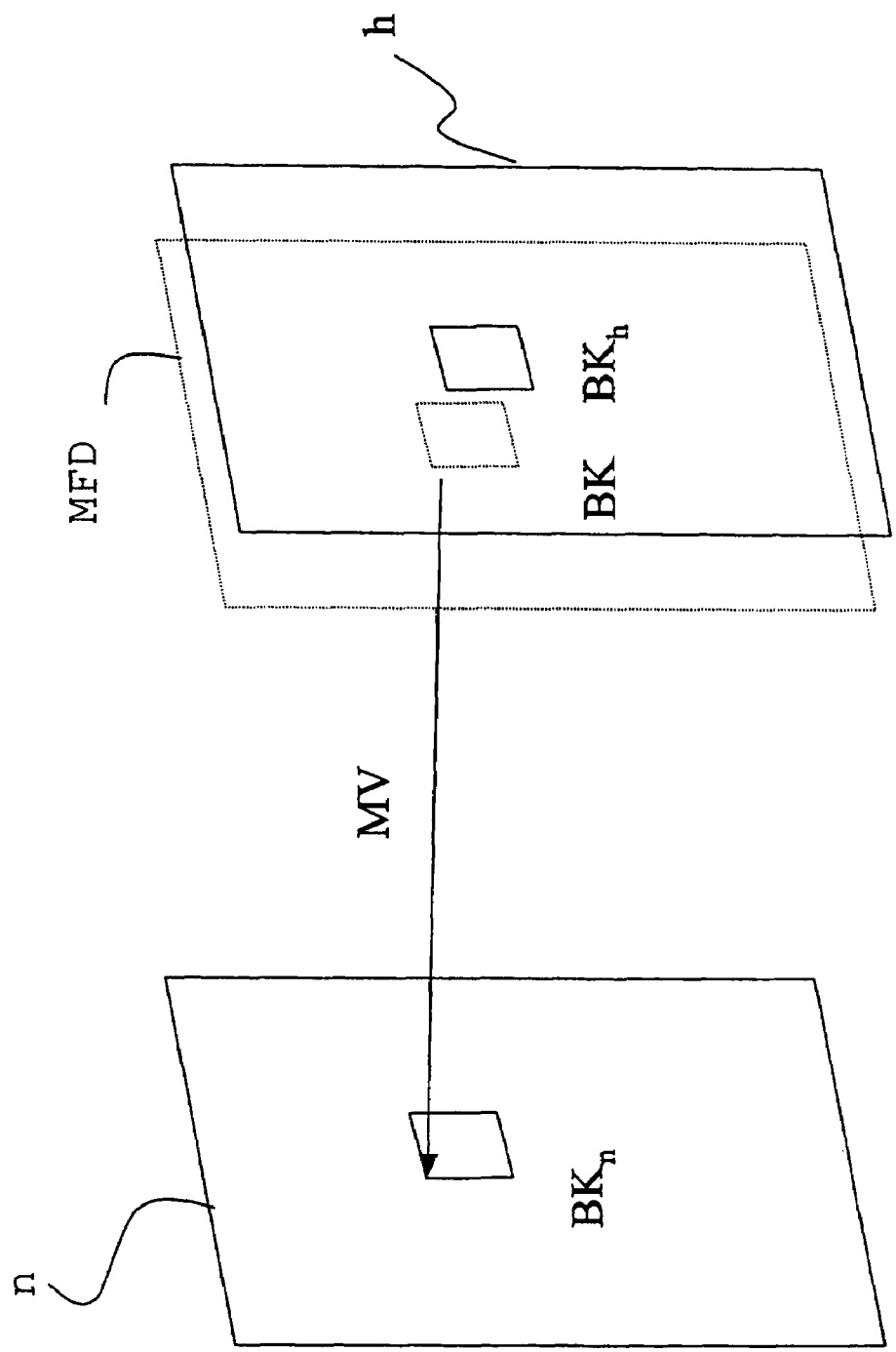
FIG. 9 illustrates a diagram corresponding to an operation of a procedure of temporal de-interlacing comprised in the method of FIG. 3.

In the case of bi-directional estimation, motion estimations, whether balanced or non-balanced, identify the movement of an object which, hypothetically, shifts from the field n preceding to the field m subsequent to the field to be reconstructed MFD. It is, however, possible for an object to disappear as it passes from one field to the other, for example because it exits the display area or because there is a change of scene in the video sequence. In this case, the motion estimations described previously would fail, since they would seek a correlation that in actual fact is absent. To solve this problem, a one-directional motion estimation can be carried out, which reconstructs the current block BK starting from just the preceding field n, which is the case illustrated in FIG. 9, or else starting from just the subsequent field m. In this case, the correlation is sought between a block belonging to the preceding field n (or else the subsequent block m) and a block $BK_h$ belonging to the current field of parity opposite to that of the current field to be reconstructed. The field with opposite parity is designated by h. This block $BK_h$ is the homologue of the current block BK to be reconstructed, i.e., it has the same spatial co-ordinates within the respective field.

In this case, it is assumed that the field h of parity opposite to that of the field to be reconstructed constitutes a valid approximation for minimization of the chosen cost function.

The motion-compensated de-interlacing procedure proposed can operate with a high sub-sampling precision, such as, for example, a quarter or even one eighth of a pixel, given that subsampling to half a pixel does not provide a precision sufficient for carrying out high-quality de-interlacing.

In this case, sub-sampling is obtained by successive approximations, i.e., by means of successive filtering steps that bring the precision from one pixel to half a pixel, and subsequently from half a pixel to a quarter of a pixel, and then (optionally) from a quarter to one eighth of a pixel. The sub-sampling operations are performed by different filters, designed for obtaining the maximum video-mage quality possible.

As regards the size of the blocks, it is, in general, advisable to operate with a size of the blocks of 16×16 pixels since this is the size adopted for motion estimation by the various video-compression standards, such as H.263 and H.263+. The video-compression procedure, for example, is also suited for the APM mode of H.263+, by splitting a macroblock of 16×16 pixels into four blocks of 8×8 pixels, for each of which a distinct motion vector is generated.

In the case of a temporal de-interlacing procedure, operating with a size of the blocks of 16×16 pixels does not, however, lead to obtaining a sufficient precision. Hence, the proposed procedure starts from a size of 8×8 pixels, then passes to 4×4 and 2×2 pixels, in a similar way to what has been already adopted for the H.263+ coding, i.e., applying subsequently just the refinement operation in order to identify the four 4×4 vectors starting from the individual 8×8 vector, and subsequently four 2×2 vectors starting from each individual 4×4 vector.

The motion-compensated de-interlacing procedure just described enables a considerable improvement to be achieved as compared to the known methods, both in terms of Peak Signal-to-Noise Ratio (PSNR) measured and in qualitative terms, i.e., by direct observation of the video sequences on television sets of professional quality.

By combining the procedure of non-motion-compensated de-interlacing of digital images of an ELA type and the motion-compensated procedure described above, as illustrated schematically in FIG. 10, it is possible to obtain a digital-image de-interlacing method that enables optimal performance.

Neither the spatial procedure nor the temporal procedure just described, in fact, is able to guarantee optimal performance in all the situations that can occur during processing of a video sequence; for this reason, it is necessary to choose each time the technique that produces the best reconstruction. This can be obtained by means of an appropriate decision module to be cascaded to the two blocks of spatial and temporal de-interlacing.

Figure 10:
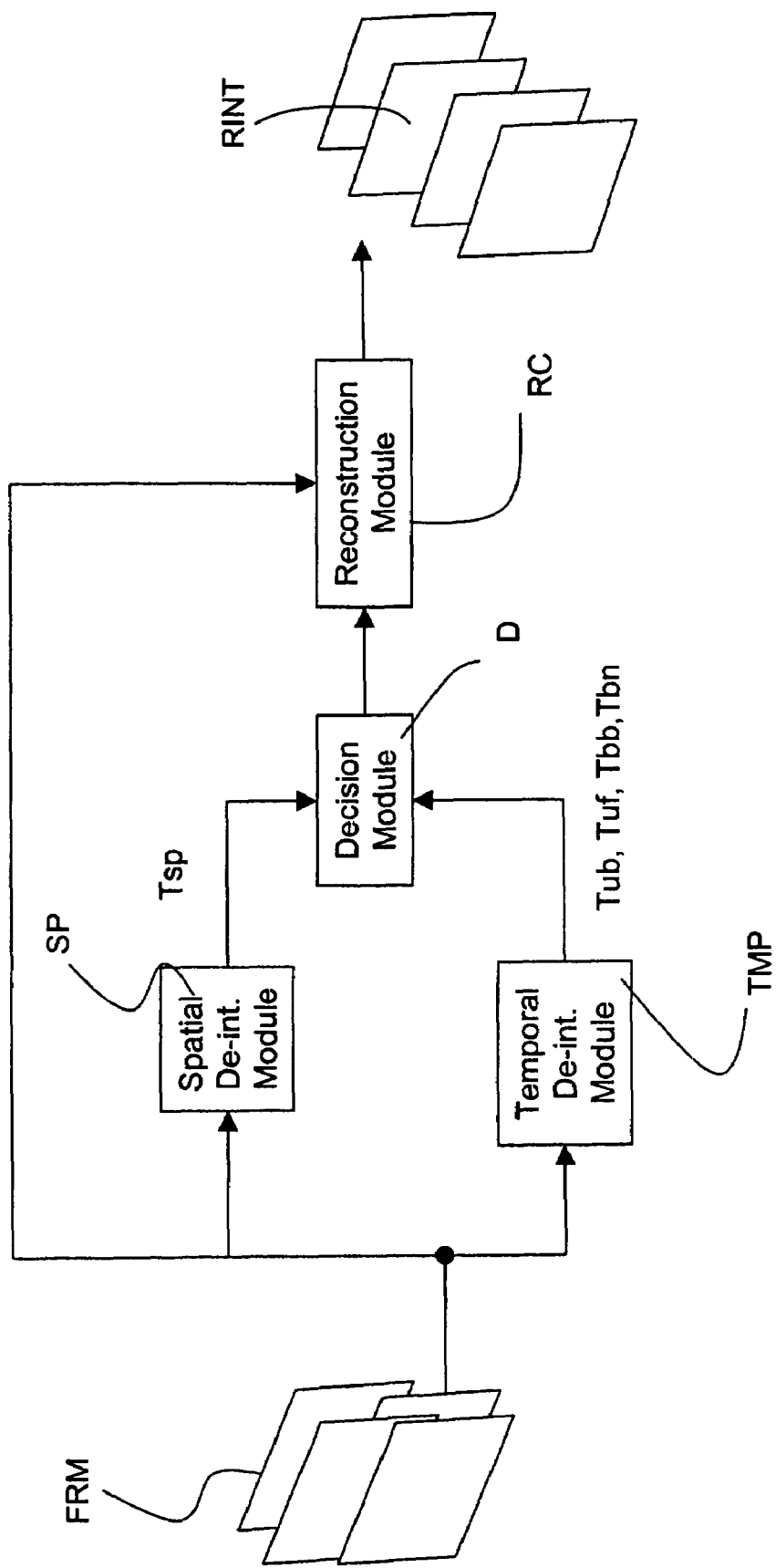
FIG. 10 illustrates a schematic circuit diagram of a de-interlacing system implementing the method of FIG. 3.

In particular, with reference to FIG. 10, there is illustrated the frame FRM, i.e., an interlaced video image, which is sent in parallel at input to a spatial-de-interlacing module SP, which implements the improved non-motion-compensated digital-image de-interlacing procedure described previously with reference to FIG. 3, and to a temporal-de-interlacing module TMP, which implements the improved motion-compensated digital-image de-interlacing procedure described previously with reference to FIGS. 8 and 9. The spatial-de-interlacing module SP supplies at output a spatial reconstruction Tsp, whilst the temporal-de-interlacing module TMP supplies at output a backward temporal reconstruction Tub, given by the unidirectional estimation on the preceding field or backward field, a forward temporal reconstruction Tuf, given by the unidirectional estimation on the subsequent field or forward field, a balanced temporal reconstruction Tbb, given by the balanced bi-directional estimation, and a non-balanced temporal reconstruction Tbn, given by the non-balanced bi-directional estimation.

For each square block BK of N×N pixels that composes a reconstructed image RINT at output of the system, a decision module D receives the corresponding spatial reconstruction Tsp and the temporal reconstructions Tub, Tuf, Tbb and Tbn.

To each of these reconstructions, or predictors, Tsp, Tub, Tuf, Tbb and Tbn, there is assigned in the decision module D a figure of merit obtained by applying a determined cost function.

As a cost function the variance of the block being examined may, for example, be chosen.

In fact, given the block BK made up of N×N pixels of values P (i,j), its M-order moment, $\mu_M$, is:

$$\mu_M = \frac{1}{N^2} \sum_{i=0}^{N} \sum_{j=0}^{N} (p(i,j))^M \quad (7)$$

and the variance var is thus defined as the difference between the second-order moment and the first-order moment (i.e., the mean) squared, i.e.,:

$$var = \mu_2 - \mu_1^2$$

Once the variance var, corresponding to a cost, has been calculated for each one of the predictors Tsp, Tub, Tuf, Tbb and Tbn of the block BK to be reconstructed, in the decision module D there is applied a function for choice of the optimal predictor.

As a choice function in the decision module D, there can for example be applied a median filter, i.e., a filter that, given a set of values, returns the value that occupies the intermediate position in said set of values.

For example, the median of the set of values (10, 80, 20) is 20; the median of the set of values (10, 80, 20, 30) is 25, which is the mean of the two intermediate values 20 and 30.

Hence, in the decision module D there is chosen, as best reconstructed block BK for composing the reconstructed image RINT, the block that corresponds to the median of the variances of the individual spatial and temporal predictors. This operation of reconstruction is carried out by means of an appropriate reconstruction module RC set at the output of the decision module D.

The reconstruction module RC receives, from the decision module D, the blocks BK chosen by means of the median filter and recomposes the field to be reconstructed MFD. Moreover, this reconstruction module RC receives at input the frame FRM, in such a way as to be able to supply at output the reconstructed image RINT with the fields arranged in an ordered way for a progressive-scan display.

The solution described above enables considerable advantages to be achieved as compared to known solutions.

The de-interlacing method described guarantees optimal performance in all the situations that can occur during processing of a video sequence, it being able to choose from time to time the technique that produces the best reconstruction. This is obtained by carrying out in an appropriate decision module, operations of application of convenient cost and choice functions, so as to prevent defects of formation of blocks from arising in the reconstructed image.

Figure 11:
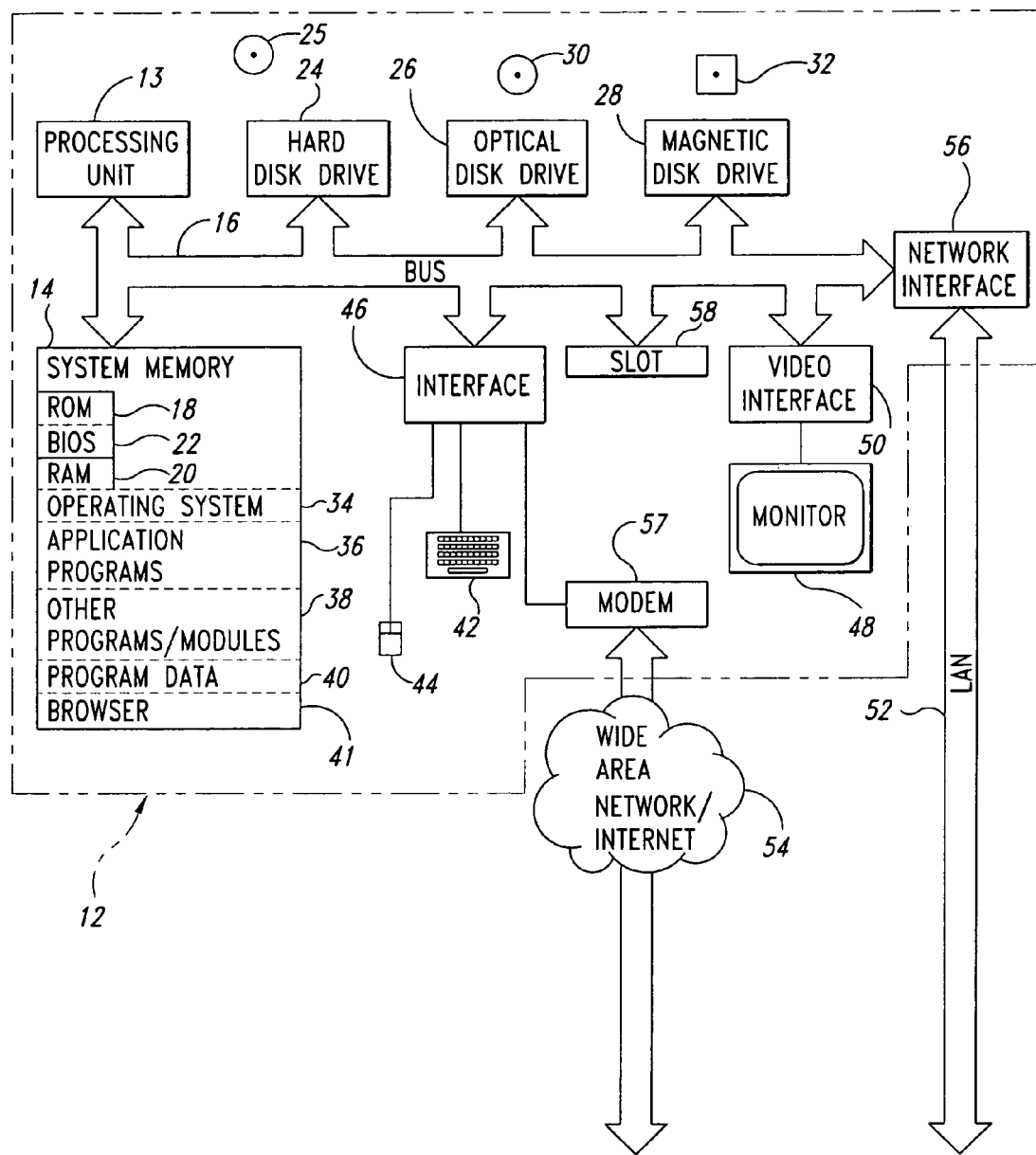
FIG. 11 is a diagram of a computer system that can be used to implement the present invention.

Those skilled in the art will recognize that the method described above may be implemented in a general purpose computer system. FIG. 11 and the following discussion provide a brief, general description of a suitable computing environment in which the invention may be implemented. Although not required, at least one embodiment of the invention can be implemented in the general context of computer-executable instructions, such as program application modules, objects, or macros being executed by a personal computer. Those skilled in the relevant art will appreciate that the invention can be practiced with other computing system configurations, including handheld devices, multiprocessor systems, microprocessor-based or programmable consumer electronics, network PCs, minicomputers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 11, a personal computer referred to herein as a computing system 12 includes a processing unit 13, a system memory 14 and a system bus 16 that couples various system components including the system memory 14 to the processing unit 13. The processing unit 13 may be any logical processing unit, such as one or more central processing units (CPUs), digital signal processors (DSPs), application-specific integrated circuits (ASIC), etc. Unless described otherwise, the construction and operation of the various blocks shown in FIG. 11 are of conventional design. As a result, such blocks need not be described in further detail herein, as they will be understood by those skilled in the relevant art.

The system bus 16 can employ any known bus structures or architectures, including a memory bus with memory controller, a peripheral bus, and/or a local bus. The system memory 14 includes read-only memory ("ROM") 18 and random access memory ("RAM") 20. A basic input/output system ("BIOS") 22, which can form part of the ROM 18, contains basic routines that help transfer information between elements within the computing system 12, such as during startup.

The computing system 12 also includes one or more spinning media memories such as a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 13 via the bus 16. The hard disk drive 24, optical disk drive 26 and magnetic disk drive 28 may include interfaces or controllers coupled between such drives and the bus 16, as is known by those skilled in the relevant art, for example via an IDE (i.e., Integrated Drive Electronics) interface. The drives 24, 26 and 28, and their associated computer-readable media, provide nonvolatile storage of computer-readable instructions, data structures, program modules and other data for the computing system 12. Although the depicted computing system 12 employs hard disk 25, optical disk 30 and magnetic disk 32, those skilled in the relevant art will appreciate that other types of spinning media memory computer-readable media may be employed, such as, digital video disks ("DVD"), Bernoulli cartridges, etc. Those skilled in the relevant art will also appreciate that other types of computer-readable media that can store data accessible by a computer may be employed, for example, non-spinning media memories such as magnetic cassettes, flash memory cards, RAMs, ROMs, smart cards, etc.

Program modules can be stored in the system memory 14, such as an operating system 34, one or more application programs 36, other programs or modules 38, and program data 40. The system memory 14 also includes a browser 41 for permitting the computing system 12 to access and exchange data with sources such as websites of the Internet, corporate intranets, or other networks, as well as other server applications on server computers. The browser 41 is markup language based, such as hypertext markup language ("HTML"), and operate with markup languages that use syntactically delimited characters added to the data of a document to represent the structure of the document.

While shown in FIG. 11 as being stored in the system memory, the operating system 34, application programs 36, other program modules 38, program data 40 and browser 41 can be stored on the hard disk 25 of the hard disk drive 24, the optical disk 30 and the optical disk drive 26 and/or the magnetic disk 32 of the magnetic disk drive 28. A user can enter commands and information to the computing system 12 through input devices such as a keyboard 42 and a pointing device such as a mouse 44. Other input devices can include a microphone, joystick, game pad, scanner, etc. These and other input devices are connected to the processing unit 13 through an interface 46 such as a serial port interface that couples to the bus 16, although other interfaces such as a parallel port, a game port or a universal serial bus ("USB") can be used. A monitor 48 or other display devices may be coupled to the bus 16 via video interface 50, such as a video adapter. The computing system 12 can include other output devices such as speakers, printers, etc.

The computing system 12 can operate in a networked environment using logical connections to one or more remote computers. The computing system 12 may employ any known means of communications, such as through a local area network ("LAN") 52 or a wide area network ("WAN") or the Internet 54. Such networking environments are well known in enterprise-wide computer networks, intranets, and the Internet.

Figure 1:
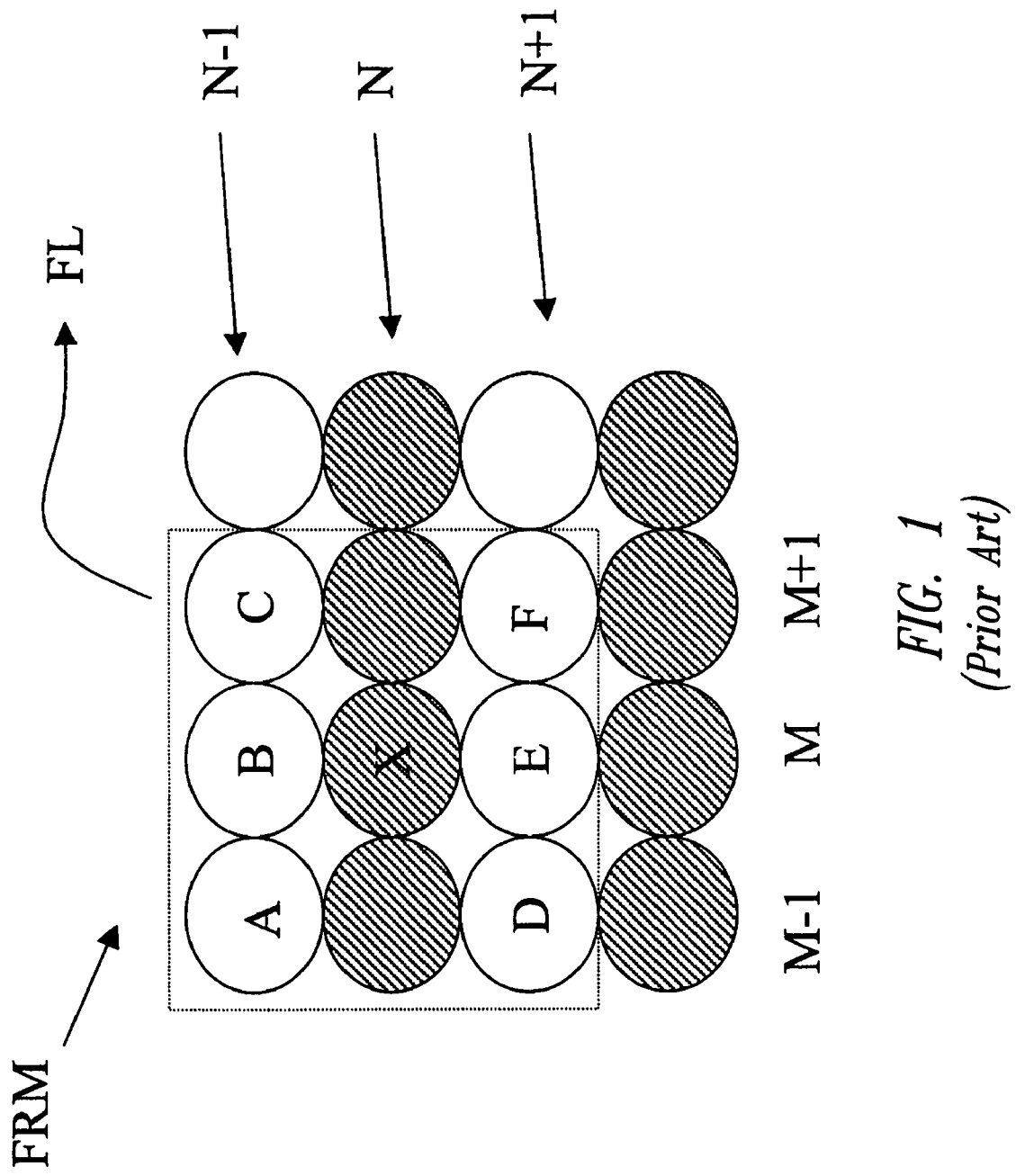
FIG. 1 and FIG. 2, which correspond to the known art, have already been described previously.

When used in a LAN networking environment, the computing system 12 is connected to the LAN 52 through an adapter or network interface 56 (communicatively linked to the bus 16). When used in a WAN networking environment, the computing system 12 often includes a modem 57 or other device for establishing communications over the WAN/Internet 54. The modem 57 is shown in FIG. 1 as communicatively linked between the interface 46 and the WAN/Internet 54. In a networked environment, program modules, application programs, or data, or portions thereof, can be stored in a server computer (not shown). Those skilled in the relevant art will readily recognize that the network connections shown in FIG. 7 are only some examples of establishing communication links between computers, and other links may be used, including wireless links.

The computing system 12 may include one or more interfaces such as slot 58 to allow the addition of devices either internally or externally to the computing system 12. For example, suitable interfaces may include ISA (i.e., Industry Standard Architecture), IDE, PCI (i.e., Personal Computer Interface) and/or AGP (i.e., Advance Graphics Processor) slot connectors for option cards, serial and/or parallel ports, USB ports (i.e., Universal Serial Bus), audio input/output (i.e., I/O) and MIDI/joystick connectors, and/or slots for memory.

The term "computer-readable medium" as used herein refers to any medium that participates in providing instructions to processing unit 13 for execution. Such a medium may take many forms, including non-volatile media and volatile media.

Common forms of computer-readable media include, for example, a floppy disk, a flexible disk, hard disk, magnetic tape, a CD-ROM, a RAM, a PROM, and EPROM, a FLASH-EPROM, any other memory chip or cartridge from which a computer can read.

Various forms of computer readable media may be involved in carrying one or more sequences of one or more instructions to processing unit 13 for execution. For example, the instructions may initially be carried on a magnetic disk of a remote computer. The remote computer can load the instructions into its dynamic memory and send the instructions over a telephone line using a modem. The modem 57 local to computer system 10 can receive the data on the telephone line and use an infrared transmitter to convert the data to an infrared signal. An infrared detector coupled to the system bus 16 can receive the data carried in the infrared signal and place the data on system bus 16. The system bus 16 carries the data to system memory 14, from which processing unit 13 retrieves and executes the instructions. The instructions received by system memory 14 may optionally be stored on storage device either before or after execution by processing unit 13.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

Of course, without prejudice the principle of the invention, the details of construction and the embodiments may vary widely with respect to what is described and illustrated herein, without thereby departing from the scope of the present invention, as defined by the annexed claims.

It may be noted, in particular, that the procedure proposed can be applied indifferently both to the European television system PAL and to the American television system NTSC, as well as to high-definition TV.

The invention claimed is:

1. In a video signal processing system, a method for de-interlacing digital images for display on a display device, comprising:

spatial de-interlacing a digital image in the video signal processing system to obtain a spatial reconstruction;

applying, to said digital image, one or more de-interlacing procedures of a temporal type to obtain one or more temporal reconstructions, at least one of said one or more de-interlacing procedures including a process of motion estimation of video signals organized in successive frames divided into macroblocks, the process comprising: a first identification phase in which, starting from a current motion vector, a best motion vector predictor is identified within a set of candidates, and a second phase of refining the best motion vector predictor thus identified; the set of candidates formed from vectors belonging to macroblocks associated with the current vector within the current frame and the preceding frame, the refining phase comprising the operation of forming a refining grid of n points centered on the central position to which a best mode vector points; and selecting from among said spatial reconstruction and said one or more temporal reconstructions, said selecting operation including the operations of applying a cost function to said spatial reconstruction and said one or more temporal reconstructions and choosing whichever of said spatial reconstruction and temporal reconstructions minimizes said cost function.

2. The method according to claim 1 herein said digital image includes a field to be reconstructed which includes a plurality of blocks o be reconstructed, wherein said spatial reconstruction and said one or more temporal reconstructions correspond to one of the blocks to be reconstructed and wherein the applying and selecting operations are repeated for each of the plurality of blocks to be reconstructed.

3. The method according to claim 1 wherein said cost function is a variance of said spatial reconstruction and said one or more temporal reconstructions with respect to a block to be reconstructed of the digital image.

4. The method according to claim 1 wherein said operation of choosing, from among said spatial reconstruction and said one or more temporal reconstructions, the reconstruction that minimizes said cost function is obtained by applying a median-filter function.

5. The method according to claim 1 wherein said spatial de-interlacing operation provides for operating on a work window of pixels of said digital image adjacent to a pixel to be reconstructed by performing linear interpolation on pairs of pixels belonging to said work window, and said spatial de-interlacing operation further comprises the following operations:
   extending the work window to a number of pairs of adjacent pixels greater than or equal to three; and
   adaptively sizing said work window.

6. The method according to claim 5 wherein adaptively sizing said work window includes varying in an adaptive way a number of pairs of pixels that are considered during each instance of the linear interpolation operation.

7. The method according to claim 6 wherein the adaptively varying operation comprises the steps of:
   using a first number of pairs of pixels for reconstructing a first pixel; and
   using for reconstructing a second pixel a work window that comprises a second number of pairs of pixels, the second number of pairs of pixels being determined staffing from the first number of pairs of pixels according to the following criteria:
   if the first pixel has been reconstructed using a pair of pixels corresponding to the vertical direction, then the second number of pairs of pixels is equal to the first number of pixels minus one;
   if the first pixel has been reconstructed using the pair of original pixels corresponding to a steepest slope possible, then the second number of pairs of pixels is equal to the first number of pairs of pixels plus one;
   in all the other cases, the second number of pairs of pixels is equal to the first number; and
   in any case, the second number of pairs of pixels must be greater than or equal to three and smaller than or equal to a maximum number of pairs of pixels determined a priori.

8. The method according to claim 1 wherein said spatial de-interlacing further comprises operations suitable for obtaining a sub-pixel degree of precision.

9. The method according to claim 1 wherein said spatial de-interlacing comprises an operation of post-processing and final filtering of the spatial reconstruction.

10. The method according to claim 9 wherein said operation of post-processing and final filtering of the spatial reconstruction is varied dynamically according to a degree of correlation with a pixel being reconstructed.

11. The method according to claim 1 wherein said applying operation includes:
   reconstructing a field to be reconstructed of the digital image by dividing the field into blocks to be reconstructed, reconstructing by interpolation of blocks belonging to a preceding field and a subsequent field, and minimizing a correlation function, wherein reconstructing by interpolation includes:
   testing a number of motion vectors temporally and spatially preceding a current one of the blocks to be reconstructed;
   choosing the best mode vector from among the number of motion vectors;
   applying the refining grid in a neighborhood of a position pointed by the best mode vector; and
   choosing a best position, in one of the preceding and subsequent fields, corresponding to the current block based on the operation of applying the refining grid.

12. The method according to claim 11 wherein said one or more temporal de-interlacing procedures comprise a procedure of non-balanced estimation, which moreover comprises the operations of:
   generating, during said testing operation, a first vector that points to the preceding field and a second vector that points to the subsequent field with respect to the field to be reconstructed of the digital image; and
   obtaining said first vector and said second vector by applying, during said operation of applying a refining grid, a first grid corresponding to the preceding field and a second grid corresponding to the subsequent field.

13. The method according to claim 11, said one or more temporal de-interlacing procedures comprising a procedure of unidirectional estimation, which further comprises the operation of reconstructing the current block staffing from just one of the preceding and subsequent fields by performing said operations of testing and of applying a grid on a block belonging to the one of the preceding and subsequent fields, and on a block belonging to a field of parity opposite to the field to be reconstructed.

14. The method of claim 1, wherein the cost function comprises calculating a variance value for each predictor of a block to be reconstructed.

15. The method of claim 14, wherein the cost function comprises a choice function that selects a median variance value from the variance values calculated for each predictor of the block to be reconstructed.

16. In a video signal processing system, a computer readable medium containing software instructions that when executed cause a computer system to de-interlace digital images for display on a display device by performing a method comprising the following operations:
   spatial de-interlacing a digital image in the video signal processing system to obtain a spatial reconstruction;
   at least one or more de-interlacing procedures including a process motion estimation of video signals organized in successive frames divided into macroblocks, the process comprising: a first identification phase in which, staffing from a current motion vector, a best motion vector predictor is identified within a set of candidates, and a second phase of refining the best motion vector predictor thus identified; the set of candidates formed from vectors belonging to macroblocks association with the current vector within the current frame and the preceding frame, the refining phase comprising the operation of forming a grid of n points centered on the central position to which a best mode vector points; and selecting from among said spatial reconstruction and said one or more temporal reconstructions, said selecting operation including the operations of applying a cost function to said spatial reconstruction and said one or more temporal reconstructions and choosing whichever of said spatial reconstruction and temporal reconstructions minimizes said cost function, the cost function comprising selecting a median variance from calculated variances of predictors for each of the spatial and temporal reconstructions.

17. In a video signal processing system, a method for de-interlacing a digital image for display on a display device, the digital image including interlaced first and second fields, the first field including first and second blocks of pixels, comprising:

spatial de-interlacing the first block in the video signal processing system to obtain a spatial reconstruction;

temporal de-interlacing the second block to obtain a temporal reconstruction, the temporal de-interlacing including:

testing a number of motion vectors temporally and spatially preceding a current one of the blocks to be reconstructed in accordance with a cost function, the cost function comprising selecting a median variance from calculated variances of predictors for each of the spatial and temporal reconstructions;

choosing a best vector from among the number of motion vectors on the basis of the testing;

applying a refining grid in a neighborhood of a position pointed by the best vector;

choosing a best position, in one of the preceding and subsequent fields, corresponding to the current block based on the operation of applying the refining grid; and creating the temporal reconstruction by interpolating a block that includes the best position; and constructing a reconstructed image for display on the display device by combining the spatial reconstruction and temporal reconstruction with the second field.

18. The method of claim 17, further comprising:

temporal de-interlacing the first block to obtain a temporal reconstruction of the first block; and determining which of the spatial reconstruction and the temporal reconstruction of the first block minimizes the cost function, wherein the construction step combines the second field with whichever of the spatial reconstruction and the temporal reconstruction of the first block minimizes the cost function.

19. The method of claim 17 wherein the spatial de-interlacing step includes, for each pixel of the first block:

constructing a work window that includes pixels of the second field adjacent to the pixel of the first block, and intermediate pixels created based on a plurality of the pixels of the second field adjacent to the pixel of the first block; and creating for the spatial reconstruction a reconstructed pixel corresponding to the pixel of the first block by performing linear interpolation on pairs of pixels of the work window.

20. The method of claim 19 wherein the first block includes first and second pixels and the spatial de-interlacing step includes adaptively sizing the work window constructed for the second pixel based on the creating step performed for the first pixel.

21. The method of claim 20 wherein the work window constructed for the first pixel includes a first number of pairs of pixels and adaptively sizing the work window constructed for the second pixel includes:

using a second number of pairs of pixels for the work window of the second pixel, equal to the first number of pixels minus one, if the first pixel has been reconstructed using a pair of pixels corresponding to a vertical direction;

using a third number of pairs of pixels for the work window of the second pixel, equal to the first number of pairs of pixels plus one, if the first pixel has been reconstructed using a pair of pixels corresponding to a steepest slope possible;

using the first number of pairs of pixels for the work window of the second pixel in other cases.

22. The method of claim 17 wherein the temporal reconstruction step includes non-balanced estimation, which includes:

generating a first vector that points to a first pixel in a preceding field and a second vector that points to a second pixel in a subsequent field with respect to the first field;

creating a first refining grid of pixels that includes the first pixel and a second refining grid of pixels that includes the second pixel;

determining a third vector that points to one of the pixels in the first refining grid and a fourth vector that points to one of the pixels in the second refining grid; and creating the temporal reconstruction by interpolating a first block that includes the pixel pointed to by the third vector and second block that includes the pixel pointed to by the fourth vector.

23. The method of claim 17 wherein the temporal reconstruction step includes unidirectional estimation, which includes reconstructing the first block starting from a block corresponding to the first block in the second field and from just one of a preceding field and a subsequent field.

24. In a video signal processing system, a method for de-interlacing digital images for display on a display device, comprising:

spatial de-interlacing a digital image in the video signal processing system to obtain a spatial reconstruction;

applying, to said digital image, one or more de-interlacing procedures of a temporal type to obtain one or more temporal reconstructions, at least one of said one or more de-interlacing procedures including a process of motion estimation of video signals organized in successive frames divided into macroblocks, the process comprising: a first identification phase in which, starting from a current motion vector, a best motion vector predictor is identified within a set of candidates, and a second phase of refining the best motion vector predictor thus identified; the set of candidates formed from vectors belonging to macroblocks associated with the current vector within the current frame and the preceding frame, the refining phase comprising the operation of forming a refining grid of n points centered on the central position to which a best mode vector points;

selecting from among said spatial reconstruction and said one or more temporal reconstructions, said selecting operation including the operations of applying a cost function to said spatial reconstruction and said one or more temporal reconstructions and choosing whichever of said spatial reconstruction and temporal reconstructions minimizes said cost function;
wherein said applying operation includes:
reconstructing a field to be reconstructed of the digital image by dividing the field into blocks to be reconstructed, reconstructing by interpolation of blocks belonging to a preceding field and a subsequent field, and minimizing a correlation function, wherein reconstructing by interpolation includes:
testing a number of motion vectors temporally and spatially preceding a current one of the blocks to be reconstructed;
choosing the best mode vector from among the number of motion vectors;
applying the refining grid in a neighborhood of a position pointed by the best mode vector;
choosing a best position, in one of the preceding and subsequent fields, corresponding to the current block based on the operation of applying the refining grid;
wherein said one or more temporal de-interlacing procedures comprise a procedure of non-balanced estimation, which moreover comprises the operations of:
generating, during said testing operation, a first vector that points to the preceding field and a second vector that points to the subsequent field with respect to the field to be reconstructed of the digital image; and
obtaining said first vector and said second vector by applying, during said operation of applying a refining grid, a first grid corresponding to the preceding field and a second grid corresponding to the subsequent field.

25. The method according to claim 24 wherein said spatial de-interlacing further comprises operations suitable for obtaining a sub-pixel degree of precision.

26. The method according to claim 24 wherein said spatial de-interlacing comprises an operation of post-processing and final filtering of the spatial reconstruction.

27. The method according to claim 26 wherein said operation of post-processing and final filtering of the spatial reconstruction is varied dynamically according to a degree of correlation with a pixel being reconstructed.

28. In a video signal processing system, a method for de-interlacing digital images for display on a display device, comprising:
spatial de-interlacing a digital image in the video signal processing system to obtain a spatial reconstruction;
applying, to said digital image, one or more de-interlacing procedures of a temporal type to obtain one or more temporal reconstructions, at least one of said one or more de-interlacing procedures including a process of motion estimation of video signals organized in successive frames divided into macroblocks, the process comprising: a first identification phase in which, starting from a current motion vector, a best motion vector predictor is identified within a set of candidates, and a second phase of refining the best motion vector predictor thus identified; the set of candidates formed from vectors belonging to macroblocks associated with the current vector within the current frame and the preceding frame, the refining phase comprising the operation of forming a refining grid of n points centered on the central position to which a best mode vector points;
selecting from among said spatial reconstruction and said one or more temporal reconstructions, said selecting operation including the operations of applying a cost function to said spatial reconstruction and said one or more temporal reconstructions and choosing whichever of said spatial reconstruction and temporal reconstructions minimizes said cost function;
wherein said applying operation includes:
reconstructing a field to be reconstructed of the digital image by dividing the field into blocks to be reconstructed, reconstructing by interpolation of blocks belonging to a preceding field and a subsequent field, and minimizing a correlation function, wherein reconstructing by interpolation includes:
testing a number of motion vectors temporally and spatially preceding a current one of the blocks to be reconstructed;
choosing the best mode vector from among the number of motion vectors;
applying the refining grid in a neighborhood of a position pointed by the best mode vector;
choosing a best position, in one of the preceding and subsequent fields, corresponding to the current block based on the operation of applying the refining grid; and
said one or more temporal de-interlacing procedures comprising a procedure of unidirectional estimation, which further comprises the operation of reconstructing the current block starting from just one of the preceding and subsequent fields by performing said operations of testing and of applying a grid on a block belonging to the one of the preceding and subsequent fields, and on a block belonging to a field of parity opposite to the field to be reconstructed.

29. The method according to claim 28 wherein said spatial de-interlacing further comprises operations suitable for obtaining a sub-pixel degree of precision.

30. The method according to claim 28 wherein said spatial de-interlacing comprises an operation of post-processing and final filtering of the spatial reconstruction.

31. The method according to claim 30 wherein said operation of post-processing and final filtering of the spatial reconstruction is varied dynamically according to a degree of correlation with a pixel being reconstructed.

32. In a video signal processing system, a method for de-interlacing a digital image for display on a display device, the digital image including interlaced first and second fields, the first field including first and second blocks of pixels, comprising:
spatial de-interlacing the first block in the video signal processing system to obtain a spatial reconstruction;
temporal de-interlacing the second block to obtain a temporal reconstruction, the temporal de-interlacing including:
testing a number of motion vectors temporally and spatially preceding a current one of the blocks to be reconstructed in accordance with a cost function;
choosing a best vector from among the number of motion vectors on the basis of the testing;
applying a refining grid in a neighborhood of a position pointed by the best vector;
choosing a best position, in one of the preceding and subsequent fields, corresponding to the current block based on the operation of applying the refining grid; and
creating the temporal reconstruction by interpolating a block that includes the best position;
constructing a reconstructed image by combining the spatial reconstruction and temporal reconstruction with the second field;

wherein the spatial de-interlacing step includes, for each pixel of the first block:
constructing a work window that includes pixels of the second field adjacent to the pixel of the first block, and intermediate pixels created based on a plurality of the pixels of the second field adjacent to the pixel of the first block; and
creating for the spatial reconstruction a reconstructed pixel corresponding to the pixel of the first block by performing linear interpolation on pairs of pixels of the work window.

33. The method of claim 32 wherein the first block includes first and second pixels and the spatial de-interlacing step includes adaptively sizing the work window constructed for the second pixel based on the creating step performed for the first pixel.

34. The method of claim 33 wherein the work window constructed for the first pixel includes a first number of pairs of pixels and adaptively sizing the work window constructed for the second pixel includes:
using a second number of pairs of pixels for the work window of the second pixel, equal to the first number of pixels minus one, if the first pixel has been reconstructed using a pair of pixels corresponding to a vertical direction;
using a third number of pairs of pixels for the work window of the second pixel, equal to the first number of pairs of pixels plus one, if the first pixel has been reconstructed using a pair of pixels corresponding to a steepest slope possible;
using the first number of pairs of pixels for the work window of the second pixel in other cases.

35. In a video signal processing system, a method for de-interlacing a digital image for display on a display device, the digital image including interlaced first and second fields, the first field including first and second blocks of pixels, comprising:
spatial de-interlacing the first block in the video signal processing system to obtain a spatial reconstruction;
temporal de-interlacing the second block to obtain a temporal reconstruction, the temporal de-interlacing including:
testing a number of motion vectors temporally and spatially preceding a current one of the blocks to be reconstructed in accordance with a cost function;
choosing a best vector from among the number of motion vectors on the basis of the testing;
applying a refining grid in a neighborhood of a position pointed by the best vector;
choosing a best position, in one of the preceding and subsequent fields, corresponding to the current block based on the operation of applying the refining grid;
creating the temporal reconstruction by interpolating a block that includes the best position; and
constructing a reconstructed image by combining the spatial reconstruction and temporal reconstruction with the second field;
wherein the temporal reconstruction step includes non-balanced estimation, which includes:
generating a first vector that points to a first pixel in a preceding field and a second vector that points to a second pixel in a subsequent field with respect to the first field;
creating a first refining grid of pixels that includes the first pixel and a second refining grid of pixels that includes the second pixel;
determining a third vector that points to one of the pixels in the first refining grid and a fourth vector that points to one of the pixels in the second refining grid; and
creating the temporal reconstruction by interpolating a first block that includes the pixel pointed to by the third vector and second block that includes the pixel pointed to by the fourth vector.

36. The method of claim 35 wherein the spatial de-interlacing step includes, for each pixel of the first block:
constructing a work window that includes pixels of the second field adjacent to the pixel of the first block, and intermediate pixels created based on a plurality of the pixels of the second field adjacent to the pixel of the first block; and
creating for the spatial reconstruction a reconstructed pixel corresponding to the pixel of the first block by performing linear interpolation on pairs of pixels of the work window.

37. The method of claim 36 wherein the first block includes first and second pixels and the spatial de-interlacing step includes adaptively sizing the work window constructed for the second pixel based on the creating step performed for the first pixel.

* * * * *

UNITED STATES PATENT AND TRADEMARK OFFICE
CERTIFICATE OF CORRECTION

| | | |
|---|---|---|
| PATENT NO. | : 7,663,695 B2 | Page 1 of 1 |
| APPLICATION NO. | : 11/041518 | |
| DATED | : February 16, 2010 | |
| INVENTOR(S) | : Danilo Pau et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1393 days.

Column 18, Line 58
"comprising: a first identification phase in which, staffing" should read --comprising: a first identification phase in which, starting--.

Signed and Sealed this

Fifth Day of October, 2010

David J. Kappos
*Director of the United States Patent and Trademark Office*